US009723459B2

(12) United States Patent
Yariv et al.

(10) Patent No.: US 9,723,459 B2
(45) Date of Patent: Aug. 1, 2017

(54) DELAYED AND TIME-SPACE BOUND NOTIFICATIONS

(75) Inventors: Eran Yariv, Zichron Yaakov (IL); Yair E. Geva, Zichron Yaakov (IL); Fadi Haik, Shafarm (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

(21) Appl. No.: 13/110,001

(22) Filed: May 18, 2011

(65) Prior Publication Data
US 2012/0295645 A1  Nov. 22, 2012

(51) Int. Cl.
*H04W 4/12* (2009.01)
*H04L 12/18* (2006.01)
(Continued)

(52) U.S. Cl.
CPC ........... *H04W 4/12* (2013.01); *H04L 12/1895* (2013.01); *H04L 12/587* (2013.01); *H04L 67/322* (2013.01); *H04W 68/00* (2013.01)

(58) Field of Classification Search
CPC ........... G06Q 10/063114; G06Q 30/02; G06Q 50/10; G06Q 10/107; G06Q 30/0204;
(Continued)

(56) References Cited

U.S. PATENT DOCUMENTS 6,438,216 B1  8/2002  Aktas
6,745,193 B1  6/2004  Horvitz et al.
(Continued)

FOREIGN PATENT DOCUMENTS

WO  WO 2011/063516 A1 *  6/2011  ............. H04L 12/58

OTHER PUBLICATIONS

Siewiorek et a. "SenSay: a Context-Aware Mobile Phone", retrieved at <<http://citeseerx.ist.psu.edu/viewdoc/summary?doi=10.1.1.70.4047&rank=1>>, 2003.*

(Continued)

*Primary Examiner* — George Eng
*Assistant Examiner* — Jing Gao
(74) *Attorney, Agent, or Firm* — Shook, Hardy & Bacon, LLP

(57) ABSTRACT

Architecture that enables alerts and notifications to have priorities and time/space durations. Non-critical alerts can be displayed in a non-obtrusive manner and alert/notifications coalesced. Alerts/notifications can be assigned priorities, thereby enabling the alerts/notifications to be non-intrusive to the user. Methods include detecting when the user is using a mobile phone (or other suitable device) and then sending the alert/notification in response to the detected use based on threshold criteria relative to an accumulated sum of alerts/notifications, and an importance level (e.g., of each). Additionally, alert/notification priority can be changed (e.g. elevated, lowered) according to time (when) and space (where), thereby enabling the user to be intrusively notified based on the level, even if not previously signaled. Time and space bounds (criteria) can be assigned to alerts/notifications for merger/grouping and/or set to be auto-dismissed if no longer applicable.

19 Claims, 8 Drawing Sheets

(51) Int. Cl.
*H04L 12/58* (2006.01)
*H04L 29/08* (2006.01)
*H04W 68/00* (2009.01)

(58) Field of Classification Search
CPC .... G06Q 30/0241; H04W 4/02; H04W 4/025; H04W 68/005; H04W 68/00; H04W 4/12; H04L 51/04; H04L 67/322; H04L 12/1895; H04L 12/587
USPC .......................... 455/412.1, 414.1, 414.2, 418
See application file for complete search history.

(56) References Cited

U.S. PATENT DOCUMENTS

| | | | |
|---|---|---|---|
| 7,035,731 B2 | 4/2006 | Smith | |
| 7,523,397 B2 | 4/2009 | Cheung et al. | |
| 7,548,955 B2 | 6/2009 | Nicholas, III | |
| 2008/0126441 A1* | 5/2008 | Giampaolo et al. | 707/204 |
| 2008/0207183 A1 | 8/2008 | Root et al. | |
| 2009/0305732 A1* | 12/2009 | Marcellino | H04L 12/587 455/466 |
| 2010/0022224 A1 | 1/2010 | Li | |
| 2010/0257490 A1* | 10/2010 | Lyon | G06F 3/0488 715/863 |
| 2010/0302066 A1 | 12/2010 | Talty et al. | |
| 2012/0072844 A1* | 3/2012 | Lefrancois des Courtis et al. | 715/736 |
| 2012/0150853 A1* | 6/2012 | Tang | 707/728 |

OTHER PUBLICATIONS

Siewiorek, et al., "SenSay: A Context-Aware Mobile Phone", Retrieved at <<http://citeseerx.ist.psu.edu/viewdoc/summary?doi=10.1.1.70.4047&rank=1>>, 2003.

* cited by examiner

DELAYED AND TIME-SPACE BOUND NOTIFICATIONS

BACKGROUND

With the growing popularity in the use of cell phones, users are also receiving alerts and notifications via the phone at an increasing rate. The alerts and notifications can be received according to different messaging technologies and for different purposes, such as SMS (short message service), emails, an upcoming meeting notification, an alarm, a geo-fencing reminder, and so on. The current phone experience is that an alert/notification is sent and received immediately and separately when the corresponding application or service detects a triggering event.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables alerts and notifications to have priorities and time/space durations. This allows non-critical alerts to be displayed in a non-obtrusive manner and also enables alert/notification coalescing. Accordingly, alerts/notifications can be assigned priorities, thereby enabling alerts/notifications to be non-intrusive to the user. Additionally, the architecture includes one or more methods that include detecting when the user is using a mobile phone (or other suitable device) and then sending the alert/notification in response to the detected use based on threshold criteria relative to an accumulated sum of alerts/notifications, and an importance level (e.g., of each).

Time and space bounds (criteria) can be assigned to alerts/notifications for merger/grouping and/or set to be auto-dismissed if no longer applicable. Additionally, alert/notification priority can be changed (e.g. elevated, lowered) according to time (when) and space (where), thereby enabling the user to be intrusively notified based on the level, even if not previously signaled.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
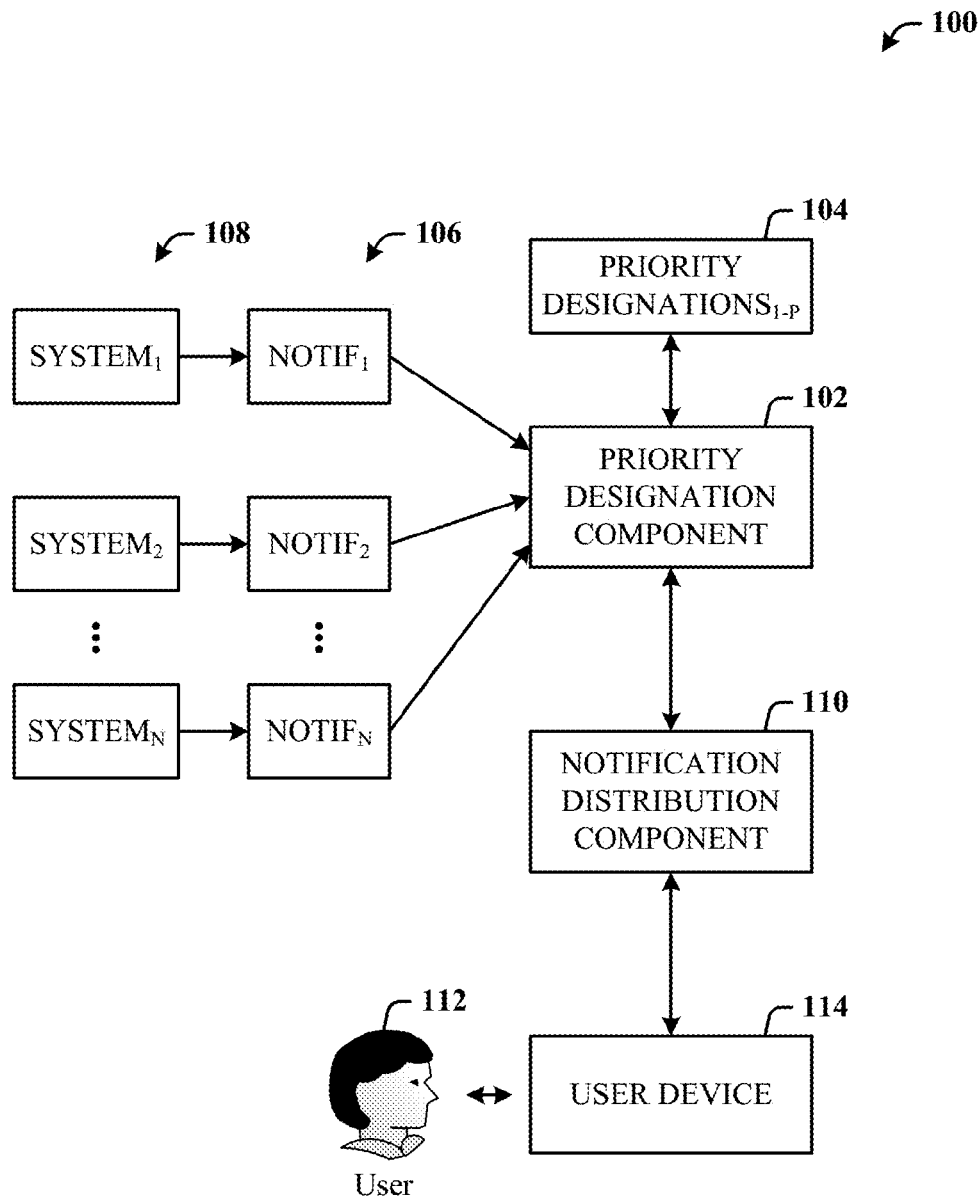
FIG. 1 illustrates a computer-implemented notification system in accordance with the disclosed architecture.

The disclosed architecture includes several techniques that make device (e.g., mobile phone) notifications less intrusive and allows the user to have longer periods of normal activity without the need to look at a mobile notification. This enhances power conservation, provides more efficient resource utilization of the device and connected services, and improves customer satisfaction from device applications and services. Note that as described herein, the term notification is intended to encompass a general category of message or communication that includes alerts, email, alarms, etc. Additionally, the architecture is described herein as applied to a mobile phone; however, it is to be understood that the disclosed architecture is not so limited, as it applies as well to other devices.

In one implementation, priorities assigned to notifications on mobile devices include three categories. A high priority designation enables notification to the user to be immediate (e.g., a time-based alarm is triggered for wake-up signal). A medium priority designation, useful for non-critical notifications, enables the user to be notified next time the user is interacting with the device (e.g., a geo-based business offer that is good for the next hour). A low priority designation indicates the user should not be notified, rather the user can be provided a visual hint (e.g., a badge) on the phone that indicates the user can explore further to get the associated content (e.g., a social networking request from a friend).

The priority designation can be suggested by the notifying service and modified by the mobile device based on the user's state. For example, if the user is occupied in the next two hours, all medium notifications can be degraded to low priority.

Where notifications are not immediate and can be delayed, the notifying application or service specifies a space/time constraint for the notification. When this constraint is met, the notification can be canceled or the associated priority designation increased or decreased.

In a first example scenario, a medium priority notification for a 1-hour coupon is only relevant for the next hour. If the user does not interact with the mobile phone for more than one hour, the alert is automatically deleted.

In a more general description, the disclosed architecture provides the ability to combine and time non-critical notification with user phone interactions. For example, notifications can be presented after the user terminates a call, since there is a high likelihood the user is paying attention to the screen of the phone. Other examples are to show notifications when the user deletes an incoming SMS (short message service), instant message, etc., show notifications after the user closed an application or moves to the home screen, and do not show notifications when the speed of the user exceeds a predefined value, since the user may be driving a vehicle, cycling, etc.

In a second scenario, a location-based coupon for a 10% discount for a shop in the mall is only relevant when the user is within a one mile radius of the mall. If the user exceeds the one mile radius, the notification is automatically dismissed.

In a third scenario, if four different medium-priority notifications, each with its own time/space existence windows, converge to coalesce, the combined grouping can be deemed sufficiently critical to trigger a single high priority combined notification. The combined notification then itemizes all notifications for presentation to the user. For example, a 10% off coupon within a shopping mall plus an option to participate in a group bid on a new camera between 11:00 AM-12:00 PM plus a product coupon at a grocery store valid between 9:30 AM-4 PM today. If the user enters the shopping mall at 11:45 AM, all three alerts become simultaneously active and the user is notified.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented notification system 100 in accordance with the disclosed architecture. The system 100 includes a priority designation component 102 that assigns priority designations 104 to notifications 106 (denoted NOTIF) of notification systems 108 (e.g., disparate systems such as email, SMS (short message service), MMS (multimedia messaging service), instant messaging, etc.), and a notification distribution component 110 that enables transmission of the notifications 106 to a user 112 of a user device 114 (e.g., mobile phone) based on the priority designations 104.

The notification distribution component 110 can be a network service that interfaces to notification systems 108 such as email servers, messaging servers, etc., to receive and cache, for example, notifications directed to the user 112. The cached notifications can each have an associated priority designation. Alternatively, only priority designated notifications will be cached and handled via the notification distribution component 110 and the non-designated notifications will be processed normally using the associated notification systems 108.

The priority designation component 102 can be implemented as a network service, as a client program, or a combination of a service and a client program. Thus, the user can make changes to the priority designations via the user device 114. When a network-based service, the service can suggest priority designations 104 to the types of notifications based on learned user behavior, for example. Additionally, the source of the notification can be used to determine the priority designation, the time of day, calendar data, date, rate of movement of the user device, and so on.

The suggested priority designation can also be based on the utilization of geo-fencing. The proximity of the user (user mobile device) relative to a point of interest can be determined according to geo-fencing technology. A geo-fence is a predefined virtual perimeter (e.g., within a two mile radius) of a physical geographic area. The user device is tracked for its geographical location. The user location (user device) can be determined and obtained using geo-location technologies such as global positioning system (GPS), cell tower systems (triangulation), wireless fidelity access points, the mobile operator, and so on.

When the user device is detected at or within the virtual perimeter defined by the geo-fence, the user can be sent a notification. The notification can simply be that the user is now within x miles from the town center or some other geographical location at the center of the geo-fence. Alternatively, the notification can be related to point of interest that include businesses in the area defined by the geo-fence, such as gas stations, theaters, restaurants, hospitals, police stations, and so on, as well as parks and hiking trails, for example.

The notifications can be generated based on user-defined preferences. In other words, the user may want to know about restaurants within three miles of town center. More robustly, the notification can be assigned a priority designation based on the urgent need to respond to the notification such as for an emergency, a user-defined priority event such as for product availability, reservations for access to a product or services, etc., or other points of interest.

The priority designations can be suggested and applied based on whether the user is in motion such as walking, running, driving, in a vehicle but not driving, and so on. These motion activities can be sensed using sensor subsystems of the user device (e.g., mobile phone) and then passed to the priority designation component 102 for processing and priority assignment, and/or processed locally in the user device 114 to automatically change the server-side assignment, affirm the server-side assignment, or signal the user to manually review and change or affirm the assignment.

This capability can also be applied to sensing user interaction with the user device and device programs. For example, if it is sensed that the user just terminated a phone call it is likely that the user is not pre-occupied (e.g., driving) such that one or more priority notifications can then be sent to the user. However, if the call was terminated yet the driver is detected as moving at a speed that is faster than running, the notification can be delayed until movement is reduced or the user is stopped. This could indicate that the user stopped at a traffic light and is more attentive, has parked and is attentive, etc.

The notifications can be transmitted, further based on time and space criteria relative to status of the user. The priority designations can include a priority designation that results in immediate transmission of a notification to the user. The priority designations can include a priority designation that results in delayed transmission of a notification to the user based on user interaction with a user communications device (e.g., a mobile phone). Additionally, the priority designations can include a priority designation that results in a hint being transmitted for perception by the user rather than the notification being transmitted. It is to be appreciated that the number of priority levels is not restricted to three but can be fewer or more priority levels as desired.

The notification distribution component 110 can combine notifications for transmission to the user as a single notification based on user interaction with a user device. The notifications are accumulated for the single notification and transmitted based on a value of summed notifications relative to a user interruption threshold. This is described herein below.

Figure 2:
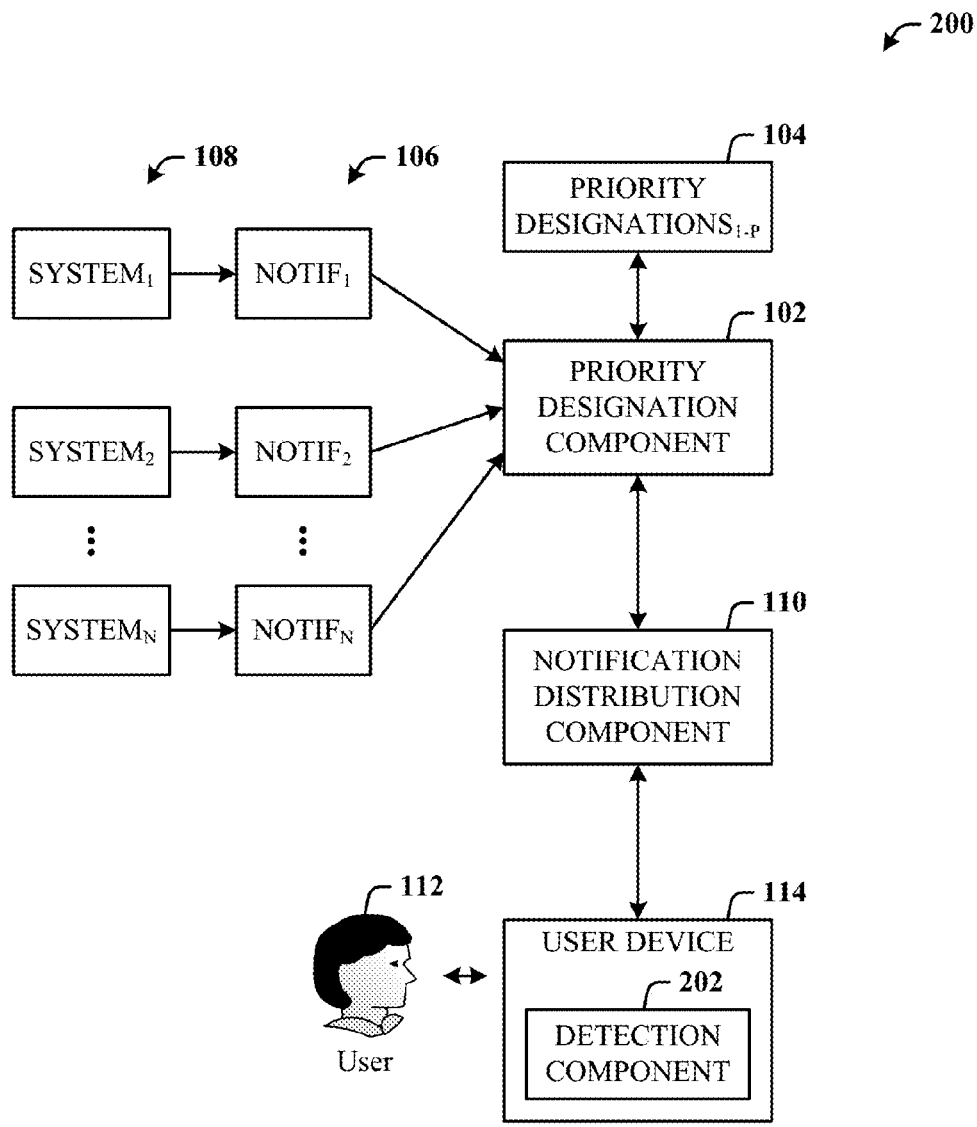
FIG. 2 illustrates an alternative embodiment of a notification system that further includes the ability to detect user status.

FIG. 2 illustrates an alternative embodiment of a notification system 200 that further includes the ability to detect user status. The system 200 further comprises a detection component 202 that detects status of a user relative to the notifications and the notification distribution component 110 enables transmission of the notifications 106 based on the status. For example, the detection component 202 can include the hardware and software on the user device 114 in support of user device sensing subsystems such as a motion sensor (e.g., accelerometer), audio, microphone, camera, etc., any combination of which can be used to sense user status. Additionally, the device display subsystem, operating system, and programs can be used to detect user interaction with the device and device subsystems. The priority designation component 102 initially assigns a priority designation of a notification and thereafter the user can change the priority designation based on the user status.

Figure 3:
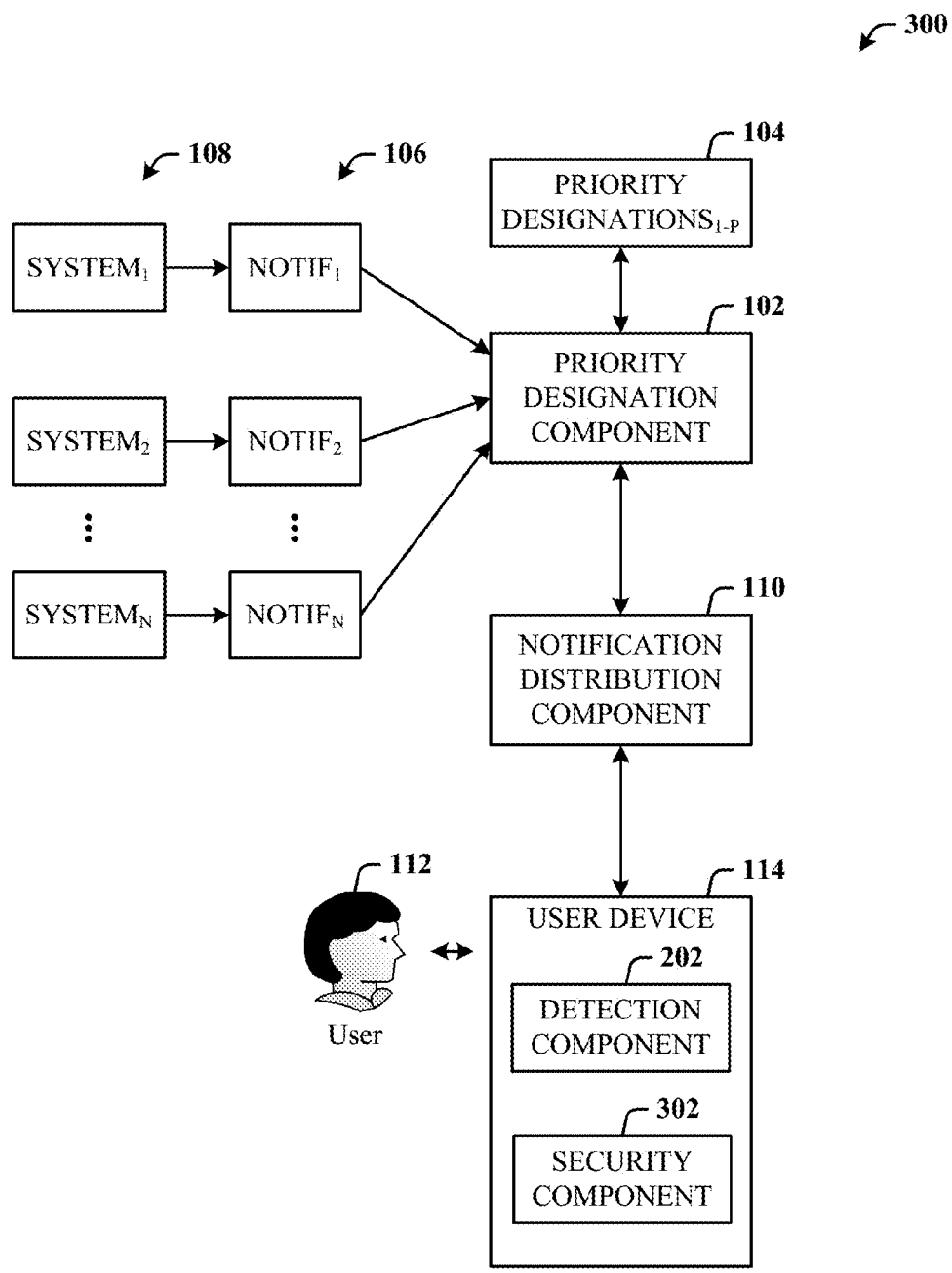
FIG. 3 illustrates an alternative embodiment of a notification system that further employs a security component for authorized and secure handling of user information.

FIG. 3 illustrates an alternative embodiment of a notification system 300 that further employs a security component 302 for authorized and secure handling of user information. The security component 302 allows the user to opt-in and opt-out of tracking information as well as personal information that may have been obtained. The user can be provided with notice of the collection of personal information, for example, and the opportunity to provide or deny consent to do so. Consent can take several forms. Opt-in consent imposes on the user to take an affirmative action before the data is collected. Alternatively, opt-out consent imposes on the user to take an affirmative action to prevent the collection of data before that data is collected. This is similar to implied consent in that by doing nothing, the user allows the data collection after having been adequately informed.

The security component 302 also allows the user to access and update profile information. For example, the subscriber can view the personal and/or tracking data that has been collected, and provide corrections or selective deletions. Where sensitive personal information such as health and financial information can be tracked and obtained, the security component 302 ensures that the data is housed using security measures appropriate for the sensitivity of the data. Moreover, vendor access to such information can be restricted using the security component 302 for access only to authorized viewers.

The security component 302 ensures the proper collection, storage, and access to the user information while allowing for the dynamic selection and presentation of the content, features, and/or services that assist the user to obtain the benefits of a richer user experience and to access to more relevant information without sacrificing personal security.

Figure 4:
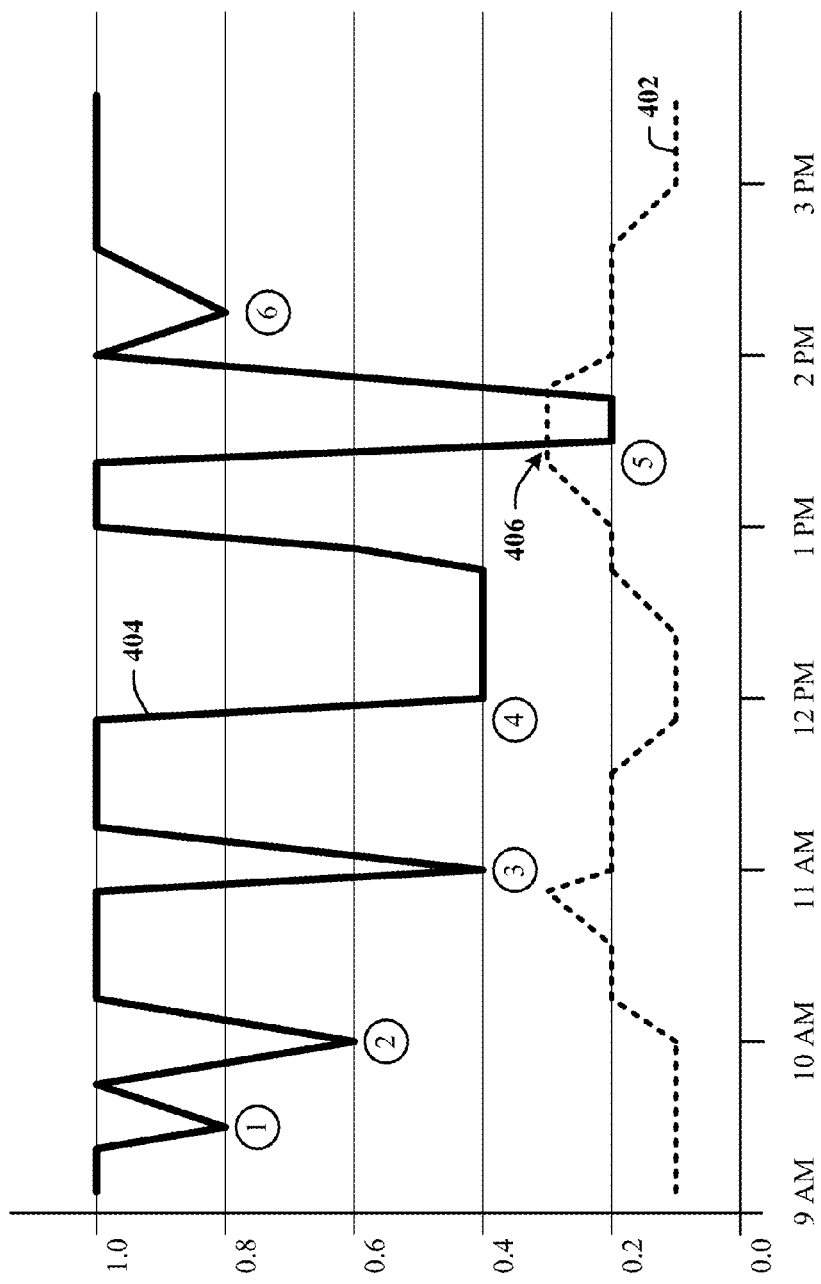
FIG. 4 illustrates a graph that depicts a summed notification trace of three different priority notifications that are each time/space constrained for a mobile phone.

FIG. 4 illustrates a graph 400 that depicts a summed notification trace 402 of three different priority notifications that are each time/space constrained for a mobile phone. Generally, specific "willingness to be interrupted" values can be assigned to user explicit actions while on the mobile phone. A weight algorithm can be employed to sum non-immediate active alerts, and when the non-immediate active alerts cross a "willingness to be interrupted" value threshold trace 404, the user is notified.

The summed notification trace 402 is presented in combination with an event threshold trace 404 that shows six points in time and the associated user status (e.g., interaction). The threshold trace 404 depicts the willingness of the user to be interrupted. For example, at user status ①, the user receives an SMS message. The willingness of the user to be interrupted based on status ① is "increased" to 0.8 relative to an initial value of 1.0. In other words, the user is more willing to be interrupted at this time by notifications, since the threshold trace 404 moves closer to the summed notification trace 402. The initial search query can be to utilize a coupon for a product.

At status ②, the user is reading email on the mobile phone. At about the same time (approximately 10 AM) the user location triggers a geo-fence for the coupon alert. Thus, the summed notification trace 402 increases from 0.1 to 0.2 (at about 10:15 AM). After reading email, the threshold trace returns to the initial level of 1.0. At about 10:30 AM as social networking alert is generated. Thus, the summed notification trace 402 increases from 0.2 to 0.3. At about 10:50 AM the coupon alert terminates. Thus, the summed notification traces 402 drops back to 0.2 at about 11 AM.

At status ③ and about 11 AM, the user is browsing the Internet on the mobile phone. No new notifications are received. At about 11:30 AM, the geo-fence notification terminates. Thus, the summed notification traces 402 drops from 0.2 at about 11:30 AM to 0.1 at about 11:50 AM.

At status ④, at about 11:50 AM, the user terminates a phone call. The threshold trace 404 then drops from 1.0 to 0.4, indicating that the user is available for notification. However, there no notifications at this time. Additionally, previous notifications for the geo-fence and the social network alert expired.

At about 12:20 PM the coupon alert is reactivated in combination with the already active social networking alert. Thus, the summed notification trace 402 increases from 0.1 to 0.2 at about 12:45 PM. At about the same time the threshold trace 404 returns to 1.0 indicating the user is not interruptible. At about 1 PM, the geo-fencing alert occurs in combination with the coupon alert and the social network alert. Thus, the summed notification trace 402 increases from 0.2 to 0.3 at about 1:20 PM.

At user status ⑤, the user is on the home screen of the mobile phone, interacting with one or more applications. The threshold trace 404 then drops from 1.0 to 0.2, thereby intersecting the summed notification trace 402 at a point 406 at about 1:30 PM. The delayed and accumulated notifications (coupon and geo-fence, and social network) are then sent to the user device. Once completed, the threshold trace 404 returns to 1.0 (at about 2 PM) indicating the user is no longer interruptible. The social network alert terminates, and the summed notification trace 402 returns to 0.2 from 0.3.

At status ⑥, the user receives a calendar notification and dismisses it. The threshold trace dips from 1.0 to 0.8 and then returns to 1.0, indicating the user is not interruptible. Additionally, the geo-fencing alert terminates and the summed notification trace 402 drops to 0.2 at about 3 PM.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
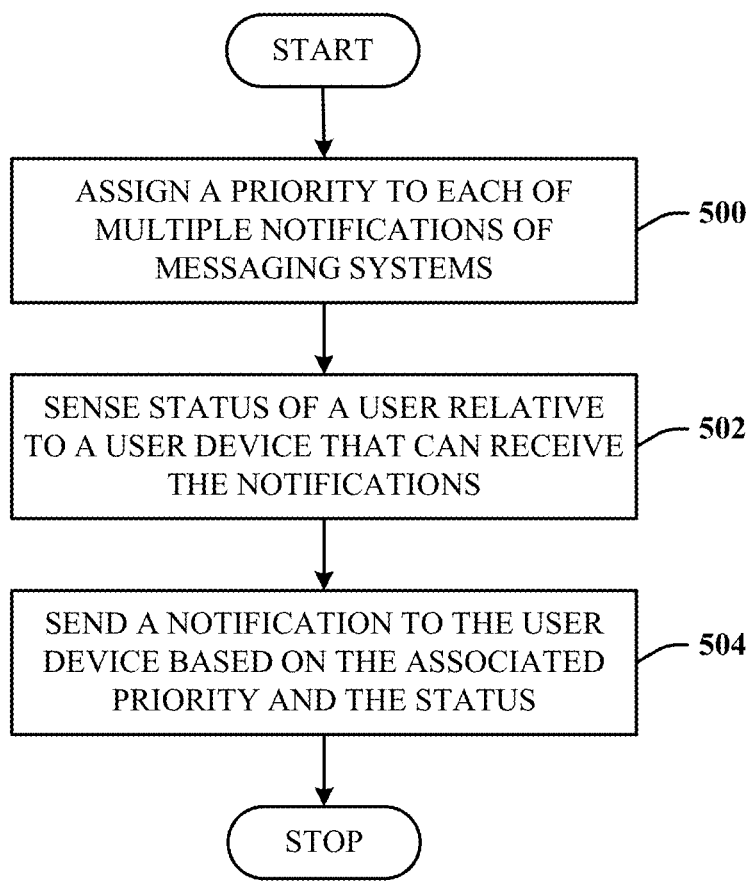
FIG. 5 illustrates a computer-implemented notification method in accordance with the disclosed architecture.

FIG. 5 illustrates a computer-implemented notification method in accordance with the disclosed architecture. At 500, a priority is assigned to each of multiple notifications of messaging systems. At 502, status of a user relative to a user device that can receive the notifications is sensed. At 504, a notification is sent to the user device based on the associated priority and the status.

Figure 6:
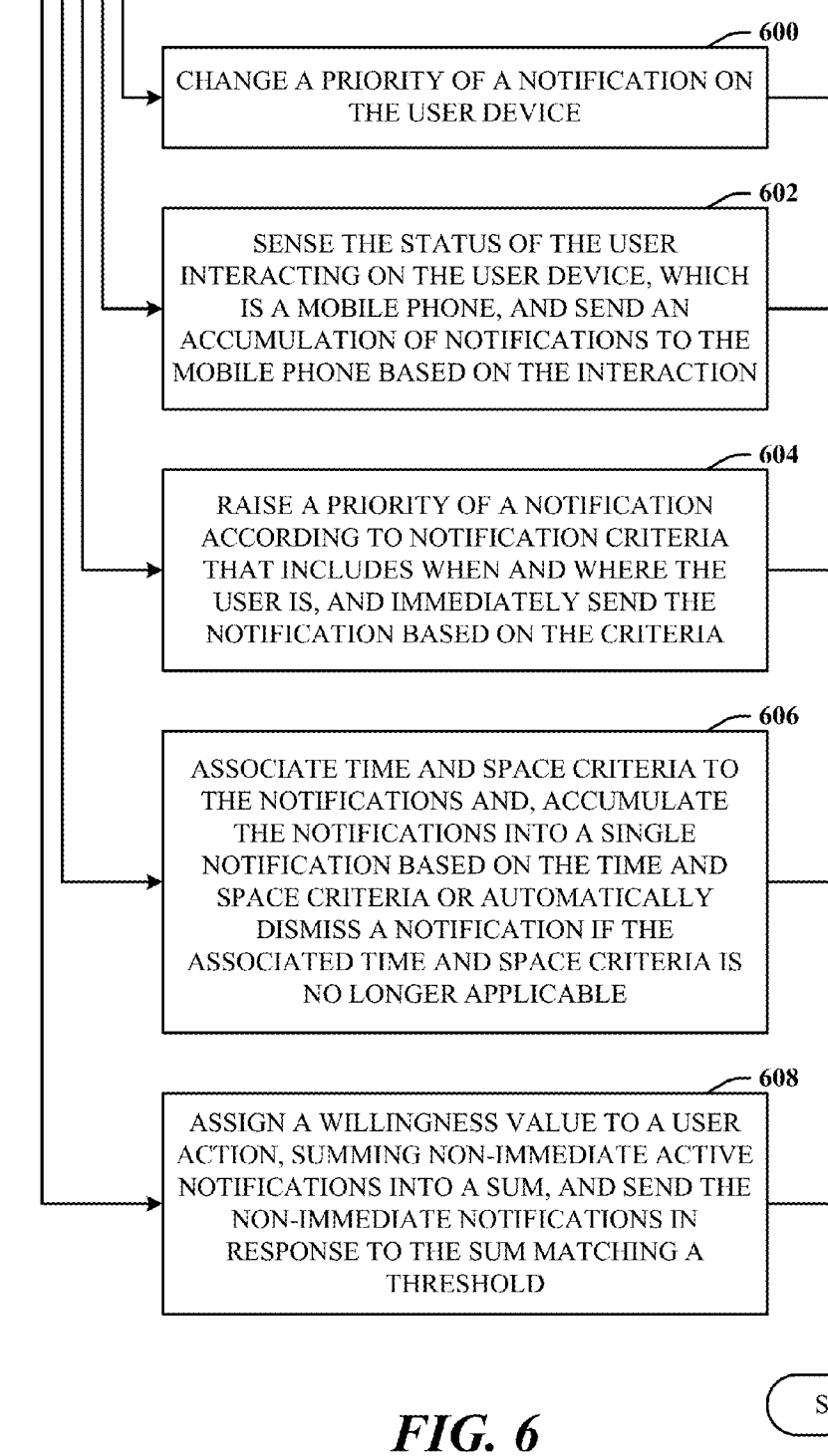
FIG. 6 illustrates further aspects of the method of FIG. 5.

FIG. 6 illustrates further aspects of the method of FIG. 5. Note that the flow indicates that each block can represent a step that can be included, separately or in combination with other blocks, as additional aspects of the method represented by the flow chart of FIG. 5. At 600, a priority of a notification is changed on the user device. At 602, the status of the user is sensed interacting on the user device, which is a mobile phone, and an accumulation of notifications is sent to the mobile phone based on the interaction. At 604, a priority of a notification is raised according to notification criteria that includes when and where the user is, and the notification is sent immediately based on the criteria. At 606, time and space criteria is associated to the notifications and, the notifications are accumulated into a single notification based on the time and space criteria or a notification is automatically dismissed if the associated time and space criteria is no longer applicable. At 608, a willingness value is assigned to a user action, non-immediate active notifications are summed into a sum, and the non-immediate notifications are sent in response to the sum matching a threshold.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
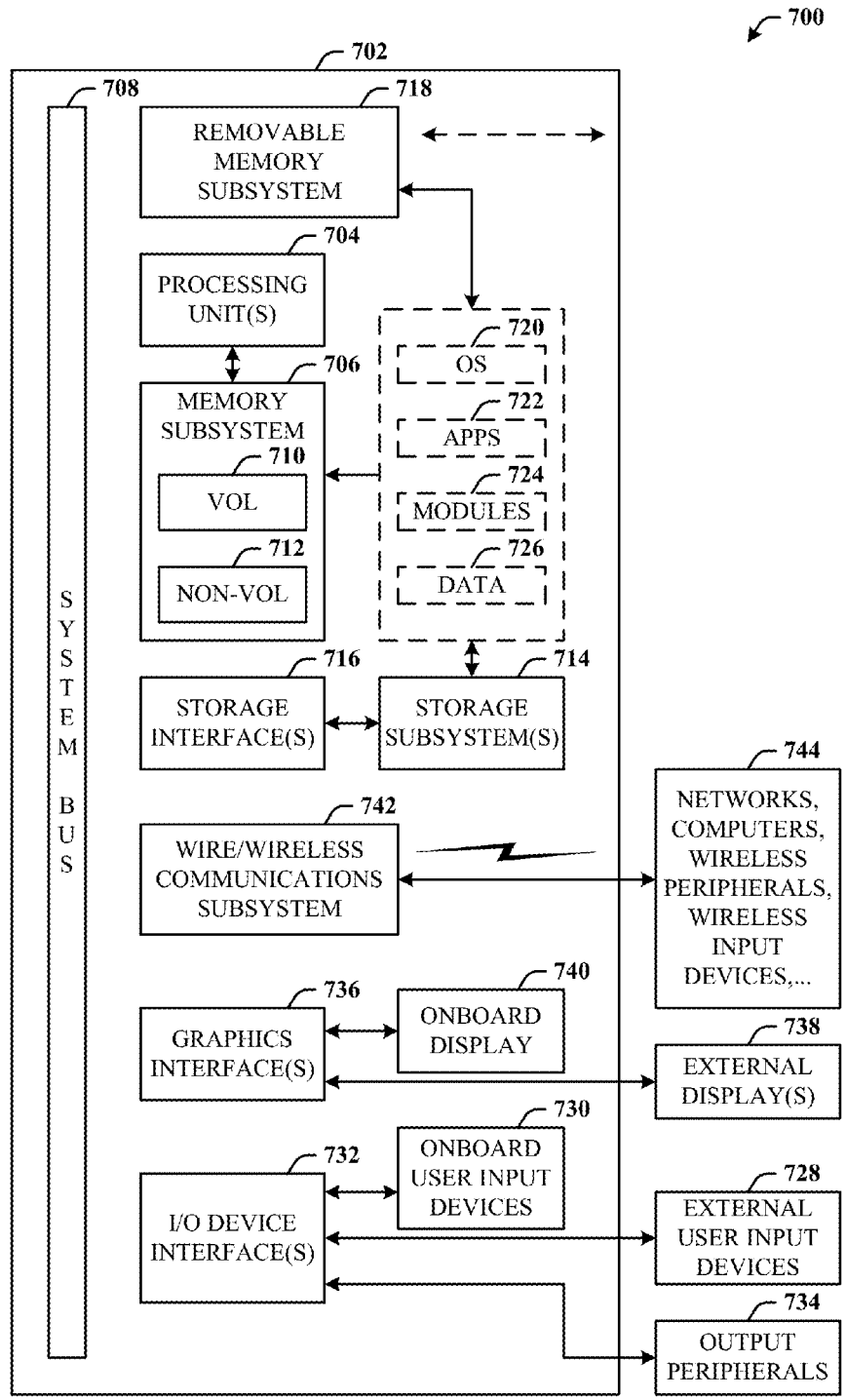
FIG. 7 illustrates a block diagram of a computing system that executes delayed and time-space bound notifications in accordance with the disclosed architecture.

Referring now to FIG. 7, there is illustrated a block diagram of a computing system 700 that executes delayed and time-space bound notifications in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include the entities and components of the system 100 of FIG. 1, the entities and components of the system 200 of FIG. 2, the entities and components of the system 300 of FIG. 3, behavior associated with the graph 400 of FIG. 4, and the methods represented by the flowcharts of FIGS. 5 and 6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
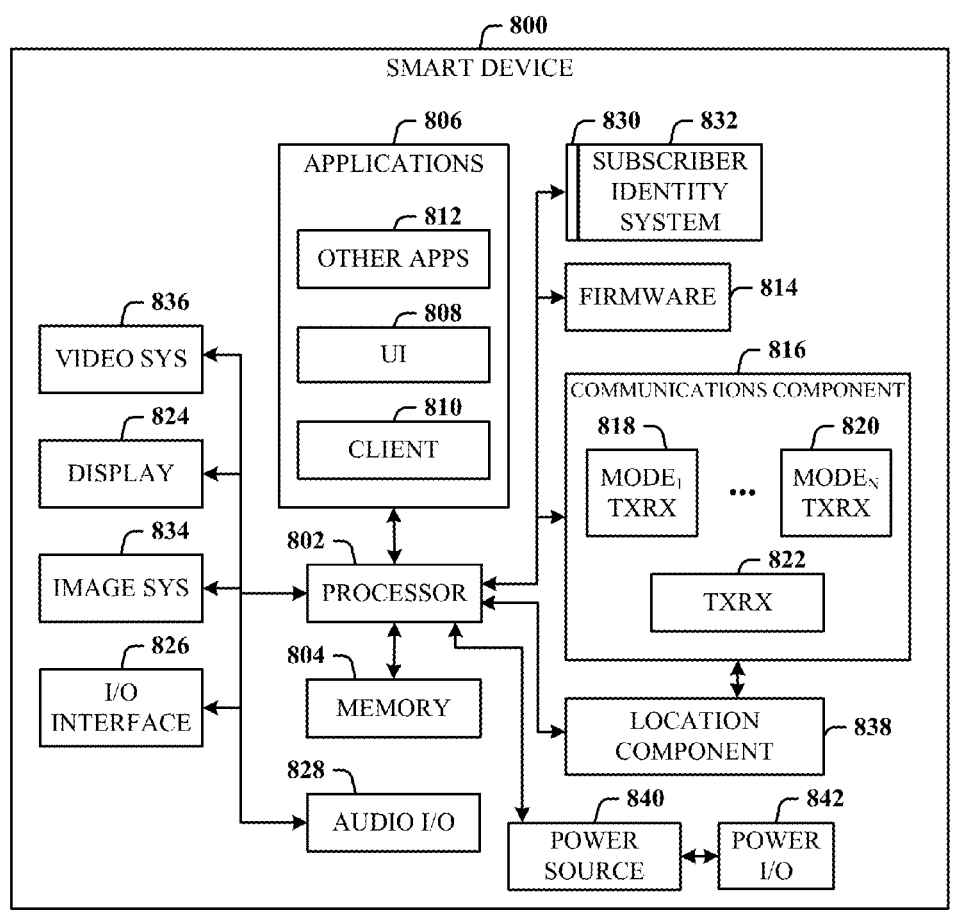
FIG. 8 illustrates a schematic block diagram of an exemplary smart mobile device that processes delayed and space-time bound notifications in accordance with the disclosed architecture.

FIG. 8 illustrates a schematic block diagram of an exemplary smart mobile device 800 that processes delayed and space-time bound notifications in accordance with the disclosed architecture. In order to provide additional context for various aspects thereof, FIG. 8 and the following discussion are intended to provide a brief, general description of a suitable environment in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The smart device 800 (e.g., a cell phone, PDA) can typically include a variety of computer-readable media. Computer-readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital video disc (DVD) or other optical disk storage, magnetic tape, magnetic disk storage or other magnetic storage devices, or any other medium which can be used to store the desired information and which can be accessed by the mobile device systems.

The smart device 800 includes a processor 802 for controlling and processing onboard operations and functions. A memory 804 interfaces to the processor 802 for the storage of data and one or more applications 806 (e.g., a video player software, user feedback component software, etc.).

The applications 806 can include priority designation component 102, detection component 202, and/or security component. The applications also facilitate direct (e.g., wired and/or wireless) communications with the external systems.

The applications 806 can also include a user interface (UI) application 808 that operates with a client 810 (e.g., operating system) to facilitate user interaction with handset functionality and data, for example, answering/initiating calls, entering/deleting data, configuring settings, address book manipulation, multimode interaction, etc. The applications 806 can include other applications 812 that came installed with the device 800 and/or can be installed as add-ons or plug-ins to the client 810 and/or UI 808, for example, or for other purposes (e.g., processor, firmware, etc.).

The other applications 812 can include voice recognition of predetermined voice commands that facilitate user control, call voice processing, voice recording, messaging, e-mail processing, video processing, image processing, music play, as well as subsystems or components described infra. Some of the applications 806 can be stored in the memory 804 and/or in a firmware 814, and executed by the processor 802 from either or both the memory 804 or/and the firmware 814. The firmware 814 can also store code for execution in power-up initialization and control during normal operation of the smart device 800.

A communications component 816 can interface to the processor 802 to facilitate wired/wireless communications with external systems, for example, cellular networks, VoIP (voice-over-IP) networks, local wireless networks or personal wireless networks such as Wi-Fi, Wi-Max, and so on. Here, the communications component 816 can also include a multimode communications subsystem for providing cellular communications via different cellular technologies. For example, a first cellular transceiver 818 (e.g., GSM) can be one mode and an Nth transceiver 820 can provide cellular communications via an Nth cellular network (e.g., UMTS), where N is a positive integer. The communications component 816 can also include a transceiver 822 for unlicensed communications (e.g., Wi-Fi, Wi-Max, Bluetooth, etc.) for corresponding communications. The communications component 816 can also facilitate communications reception from terrestrial radio networks (e.g., broadcast), digital satellite radio networks, and Internet-based radio services networks.

The smart device 800 can process IP data traffic via the communications component 816 to accommodate IP traffic from an IP network such as, for example, the Internet, a corporate intranet, a home broadband network, a personal area network, etc., via an ISP or broadband cable provider. Thus, VoIP traffic can be utilized by the smart device 800 and IP-based multimedia content can be received in an encoded and/or decoded format.

The smart device 800 includes a display 824 for displaying multimedia that include text, images, video, telephony functions (e.g., a Caller ID function), setup functions, menus, etc. The display 824 can also accommodate the presentation of multimedia content (e.g., music metadata, messages, wallpaper, graphics, etc.).

An input/output (I/O) interface 826 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, etc.). The I/O interface 826 can be utilized for updating and/or troubleshooting the smart device 800, for example.

Audio capabilities can be provided via an audio I/O component 828, which can include a speaker for the output of audio signals related to, for example, indication that the user pressed the proper key or key combination to initiate the user feedback signal, call signals, music, etc. The audio I/O component 828 also facilitates the input of audio signals via a microphone to record data and/or telephony voice data, and for inputting voice signals for telephone conversations.

The smart device 800 can include a slot interface 830 for accommodating a subscriber identity system 832 that can accommodate a SIM or universal SIM (USIM), and interfacing the subscriber identity system 832 with the processor 802. However, it is to be appreciated that the subscriber identity system 832 can be manufactured into the smart device 800 and updated by downloading data and software thereinto, such as the access information described herein.

An image capture and processing system 834 (e.g., a camera) can be provided for decoding encoded image content. Additionally, as indicated, photos can be obtained via an associated image capture subsystem of the image system 834. The smart device 800 can also include a video component 836 for processing video content received and, for recording and transmitting video content.

Optionally, a geolocation component 838 (e.g., GPS-global positioning system) facilitates receiving geolocation signals (e.g., from satellites via the communications component 816) that define the location of the smart device 800. Alternatively, or in combination therewith, the geolocation component 838 can facilitate triangulation processing for locating the smart device 800.

The smart device 800 also includes a power source 840 in the form of batteries and/or an AC power subsystem, which power source 840 can interface to an external power system or charging equipment (not shown) via a power I/O component 842.

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented notification system, comprising:
 a processor; and computer storage memory having computer-executable instructions stored thereon which, when executed by the processor, configure the system to:

receive, via a user communications device, a first notification to be communicated to a user;

assign a first priority designations to the first notification;

determine that the first priority designation is less than a threshold criteria used to determine that a notification should be communicated to the user;

in response to said determining, hold the first notification without communicating the notification to the user;

receive, via the user communications device, a second notification to be communicated to the user;

assign a second priority designations to the second notification;

determine that the second priority designation is less than the threshold criteria used to determine that a notification should be communicated to the user;

combine the first priority designation with the second priority designation to form a summed notification designation;

determine that the summed notification designation satisfies the threshold criteria; and transmit the first and second notifications based on the summed notification designation exceeding the threshold criteria.

2. The system of claim 1, wherein the first priority designation is based on a time criteria relative to status of the user.

3. The system of claim 1, wherein the first priority designation is based on a user location.

4. The system of claim 1, wherein the first priority designation is based on a time-sensitivity of the first notification.

5. The system of claim 1, wherein the threshold criteria is decreased when the user terminates a phone call.

6. The system of claim 1, wherein the threshold criteria is decreased when the user is on a home screen of the user communication device.

7. The system of claim 1, wherein the threshold criteria changes as a status of the user changes.

8. The system of claim 1, wherein the first notification comprises a badge.

9. One or more computer-storage hardware media comprising computer executable instructions embodied thereon, that when executed by a computing device, cause the computing device to perform a method of distributing notifications to a user, the method, comprising:

receiving, via a user communications device, a first notification to be communicated to a user;

assigning a first priority designations to the first notification;

determining that the first priority designation is less than a threshold criteria used to determine that a notification should be communicated to the user;

in response to said determining, holding the first notification without communicating the notification to the user;

receiving, via the user communications device, a second notification to be communicated to the user;

assigning a second priority designations to the second notification;

determining that the second priority designation is less than the threshold criteria used to determine that a notification should be communicated to the user;

combining the first priority designation with the second priority designation to form a summed notification designation;

determining that the summed notification designation satisfies the threshold criteria; and transmitting the first and second notifications based on the summed notification designation exceeding the threshold criteria.

10. The media of claim 9, wherein the first priority designation is based on a time criteria relative to status of the user.

11. The media of claim 9, wherein the wherein the first priority designation is based on a user location.

12. The media of claim 9, wherein the threshold criteria is decreased when the user terminates a phone call.

13. The media of claim 9, wherein the threshold criteria is decreased when the user is on a home screen of the user communication device.

14. The media of claim 9, wherein the first notification comprises a badge.

15. A method, comprising:

receiving, via a user communications device, a first notification to be communicated to a user;

assigning a first priority designations to the first notification;

determining that the first priority designation is less than a threshold criteria used to determine that a notification should be communicated to the user;

in response to said determining, holding the first notification without communicating the notification to the user;

receiving, via the user communications device, a second notification to be communicated to the user;

assigning a second priority designations to the second notification;

determining that the second priority designation is less than the threshold criteria used to determine that a notification should be communicated to the user;

combining the first priority designation with the second priority designation to form a summed notification designation;

determining that the summed notification designation satisfies the threshold criteria; and transmitting the first and second notifications based on the summed notification designation exceeding the threshold criteria.

16. The system of claim 15, wherein the first priority designation is based on a time criteria relative to status of the user.

17. The system of claim 15, wherein first priority designation is based on a user location.

18. The system of claim 15, wherein the first priority designation is based on a time-sensitivity of the first notification.

19. The system of claim 15, wherein the threshold criteria is decreased when the user terminates a phone call.

* * * * *